United States Patent [19]
Kurtzberg et al.

[11] Patent Number: 5,735,546
[45] Date of Patent: Apr. 7, 1998

[54] METHOD FOR CONTROLLING A MANUFACTURING PROCESS UTILIZING CONTROL CHARTS

[75] Inventors: Jerome M. Kurtzberg; Menachem Levanoni. both of Yorktown Heights, N.Y.

[73] Assignee: IBM Corporation. Armonk, N.Y.

[21] Appl. No.: 724,632

[22] Filed: Oct. 1, 1996

[51] Int. Cl.⁶ .................................................. B42D 15/00
[52] U.S. Cl. ................................................................ 283/67
[58] Field of Search ............................... 283/115, 117, 283/48.1, 44; 281/38

[56] References Cited

U.S. PATENT DOCUMENTS

| 4,346,697 | 8/1982 | Cohen | 283/115 X |
| 5,178,544 | 1/1993 | Aleck | 283/115 X |

*Primary Examiner*—Willmon Fridie, Jr.
*Attorney, Agent, or Firm*—Stephen Kaufman, Esq.; IBM Corporation

[57] ABSTRACT

The present invention discloses methodology for qualitatively extending and exploiting the utility of presently known manufacturing control charts, so that one is enabled to take corrective actions prior to out-of-control conditions occurring. To this end, the invention retrofits extant control-charts with a predictive or forecasting capability combined with a signal capability.

9 Claims, 3 Drawing Sheets

ABC XR CHARTS:

METHOD FOR CONTROLLING A MANUFACTURING PROCESS UTILIZING CONTROL CHARTS

BACKGROUND OF THE INVENTION

This invention relates to a novel method for controlling a manufacturing process utilizing control charts.

INTRODUCTION TO THE INVENTION

Control charts are a well-known and important means for monitoring the state of a manufacturing process. An example of typical control charts is shown in FIGS. 1A, B (numerals 10, 12).

In particular, FIG. 1A shows a control chart 10 comprising an ordinate time series of a manufacturing variable (sample number) and an abscissa control limit window (upper control UCL and lower control limit LCL). The FIG. 1A control chart 10 provides data in response to an inquiry: Is the manufacturing process centered?

The FIG. 1B control chart 12 comprises an ordinate time series of a manufacturing variable (sample number) and an abscissa control limit window, and is complimentary to the FIG. 1A control chart 10 in that the control chart 12 provides data in response to the variability of the manufacturing process.

SUMMARY OF THE INVENTION

Our work centers on a critique of the capabilities of extant control charts, of the type illustratively shown in FIG. 1, to an end of disclosing novel methodology which can qualitatively extend and exploit their utility. To this end, we note that present control charts are inherently passive, in a sense that, notwithstanding that control charts can flag out-of-control conditions to thereby indicate a need for corrective action, they can not and do not react predictively to out of control conditions. Consequently, and disadvantageously, an appreciable amount of time may elapse after the occurrence of out of control conditions before the control charts react, thereby resulting in irreparable damage and defective product.

As just alluded to, we have now discovered a novel method that can preserve the advantages and features of extant control charts, while it extends and more fully exploits their utility and potential capability.

In a first aspect, the novel method comprises the steps of:

1) constructing a standard control-chart comprising a time series of a manufacturing variable of interest;
2) forecasting future values of the time series;
3) comparing a derived step 2 future value with a control window limit;

and 4) generating a signal based on the step 3 comparison.

In a second aspect, the novel method comprises the steps of:

1) constructing an open loop control chart comprising a time series of a manufacturing variable;

and 2) closing the open loop control chart by:
   i) forecasting future values of the time series;
   ii) comparing a derived future value with a control window limit;

and iii) generating a signal based on the comparison.

An important advantage of the present invention as defined is that it enables corrective actions to be implemented prior to out-of-control conditions occurring. Thus, one can use manufacturing control charts to anticipate highly likely production problems, and prevent their occurrence, thereby operating manufacturing facilities in a problem-prevention mode, rather than the normal reaction-to-problem mode. Other advantages, including versatility and efficiency of operation, are disclosed below.

BRIEF DESCRIPTION OF THE DRAWING

The invention is illustrated in the accompanying drawing, in which.

and

Figure 3A:
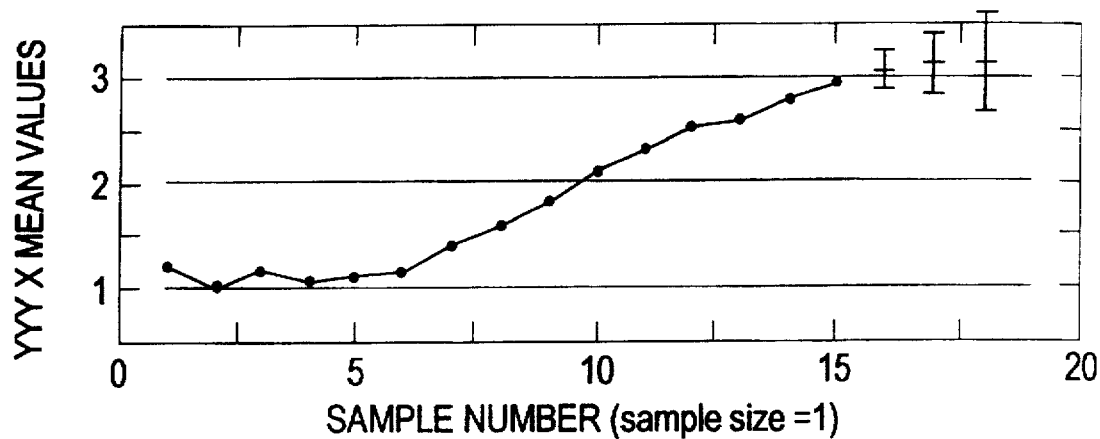

FIGS. 3A, B show illustrative control charts in accordance with aspects of the present invention.

DETAILED DESCRIPTION OF THE INVENTION

The invention as summarized above may be advantageously re-conceptualized as a feedback construct.

Figure 1A:
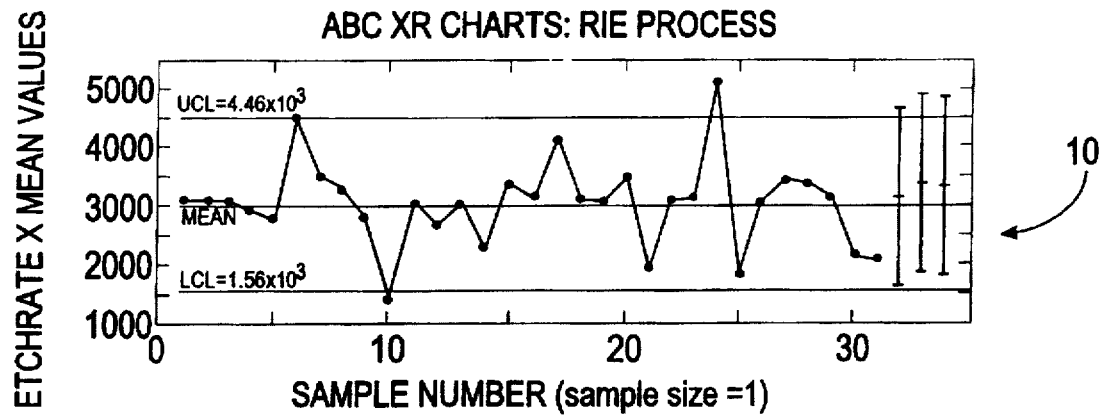
FIGS. 1A, B show illustrative prior art control charts.
Figure 1B:
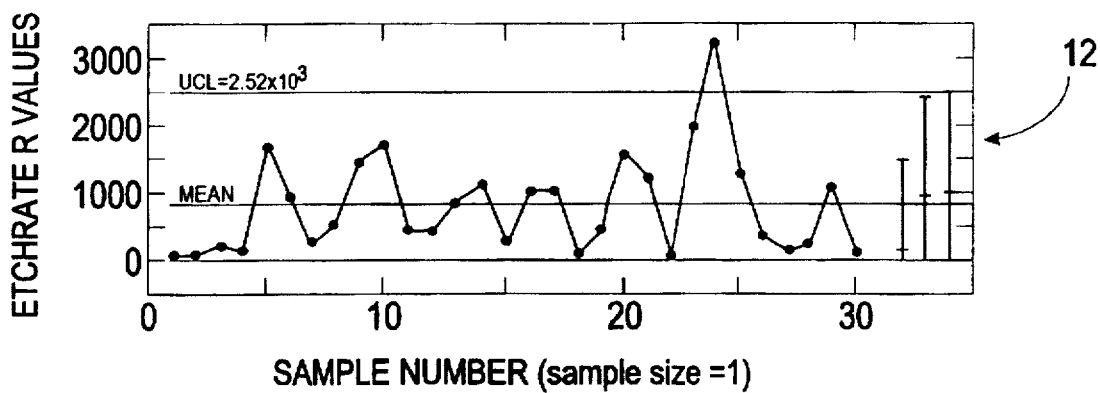
Figure 2A:
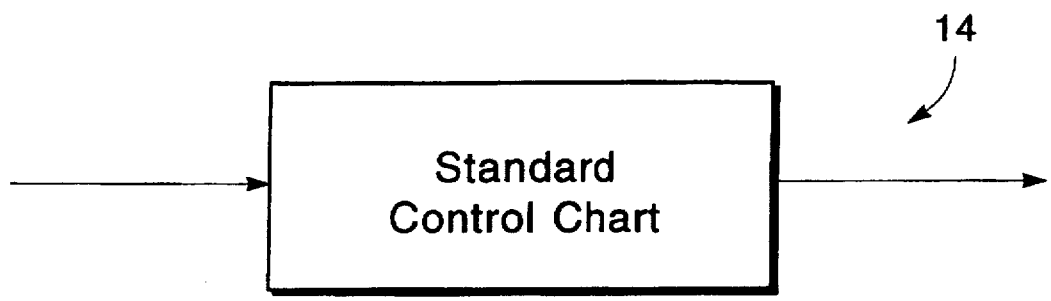
FIGS. 2A, B show open and closed-loop conceptualizations of the present invention.

First, prior art control charts, of the type shown in FIG. 1 and known as normal Shewhart or CuSum control charts, are open loop, as illustrated in FIG. 2A, numeral 14. It is in the inherent nature of the open loop 14 that it cannot alert a manufacturing engineer that a manufacturing process is heading towards an out-of-control state prior to production of defective product.

Figure 2B:
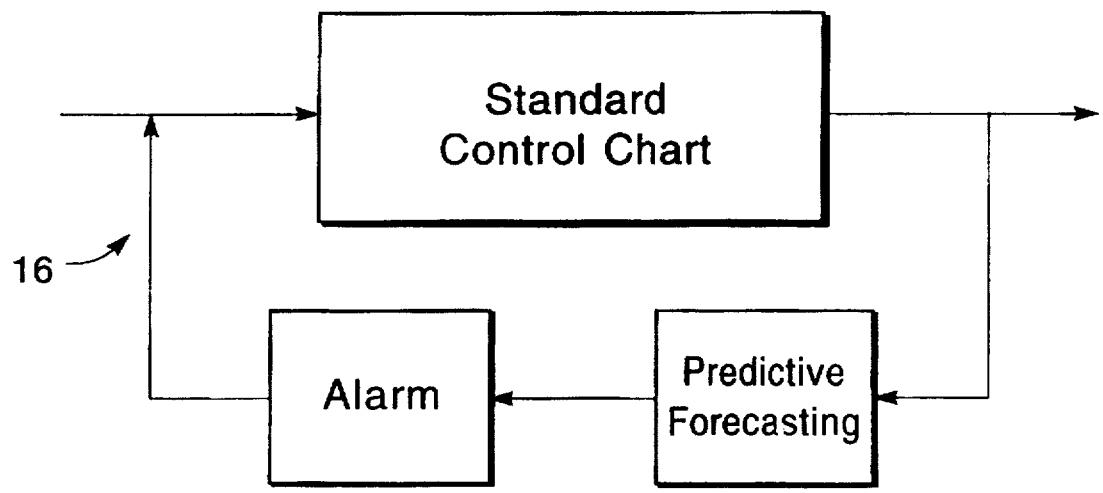

The present invention, in sharp contrast to the prior art, may be conceptualized as a closed-loop feedback system, as exemplified in FIG. 2B, numeral 16. Here, the closed-loop capability can provide enablement for 1) forecasting the future values of the time series; 2) comparing the derived future value with a control window limit; and 3) generating an (alarm) signal (visual/auditory) based on the comparison. In this way, accordingly, the present invention can enable the engineer to operate in a preventive mode, rather than a reactive mode, to thereby control the manufacturing process and ensure high quality production.

We now disclose eight preferred steps in realization of the method of the present invention.

Step 1

Creating a normal Shewhart or CuSum control chart with targets and upper and lower control limits. See, for example, J. M. Juran "Quality Control Handbook", McGraw-Hill, 1988, or Acheson J. Duncan "Quality Control and Industrial Statistics", Irwin Inc. 1986, which materials are incorporated by reference herein.

Step 2

Extending the control limits to the desired region of prediction.

Step 3

Using the previous points on the chart to forecast the next expected point. For example, conventional auto-regression or moving averages techniques can accomplish this prediction, including confidence intervals for the prediction.

Step 4

Predicting the next point on the chart, based on all previous points, including the one predicted in the previous step.

Step 5

Continuing with new predictions, if desired, using all previous points, including previous predictions, until the desired region of prediction is complete.

Step 6

Plotting all prediction points, with their confidence intervals, on the existing control chart.

Step 7

If any of the prediction points crosses over the upper or lower control limits, alerting the user that, unless action is taken immediately, the process will be out-of-control in N runs, where N is equal to the number of the first predictive point which crosses the control limit. The confidence intervals can be used to state the degree of confidence in the alert.

Step 8

Updating the control chart with new measurements and repeat the steps discussed above. Continue for duration of production.

EXAMPLE

An example of the present invention is illustrated in FIGS. 3A, B, numerals 18,20.

Figure 3B:
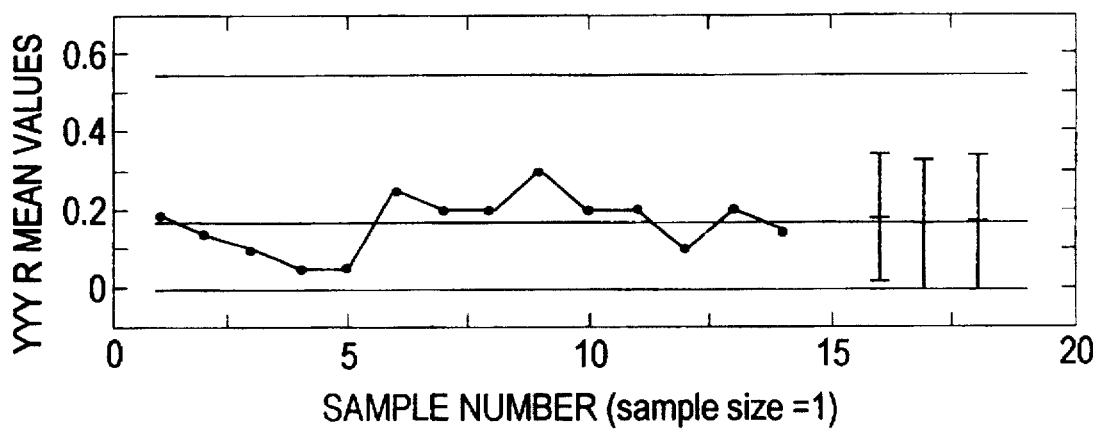

The FIG. 3A illustration was taken from an actual implementation of the disclosed predictive control chart procedure, using manufacturing data from a photosector. Note that the predicted process behavior indicates that the process is under control and will remain so. The FIG. 3B illustration 20 depicts a process which initially was in control, and then drifted but still remained within the control limits. The disclosed invention indicated that the process soon would be out of control and produce defective items.

We claim:

1. A computer performed process for monitoring the state of a manufacturing process comprising the steps of:
   1) constructing a conventional control chart comprising an ordinate time series of a manufacturing variable of interest, and an abscissa control limit window consisting of an upper and lower control limit;
   2) utilizing the previous points on said control chart to forecast a predicted value of the time series;
   3) plotting said predicted value;
   4) predicting a further value of the time series on said control chart based on all previous points including said predicted value;
   5) continuing to predict and plot said predicted values of the time series according to steps 3 and 4 until the desired region of prediction is complete
   6) alerting a user that said manufacturing process will be out-of-control in N time increments whenever a predicted value crosses over the upper or lower control limit.

2. A method according to claim 1, wherein step 1 comprises the time series based on averages of samples of the manufacturing variable.

3. A method according to claim 1, wherein step 1 comprises constructing the time series based on variability of samples of the manufacturing variable.

4. A method according to claim 1, wherein step 2 comprises forecasting values of auto-regression smoothing analysis.

5. A method according to claim 1, wherein step 2 comprises forecasting values by time-expotential smoothing techniques.

6. A method according to claim 1, wherein step 4 comprises generating the signal based on confidence levels derived from the step 2 pre-selected forecasting value.

7. A method according to claim 1, comprising a further recursive step of updating the control limit window based on additional predicted values.

8. A method according to claim 1, wherein step 4 comprises generating a signal based on a manufacturing standard.

9. A computer performed process for monitoring the state of a manufacturing process comprising the steps of:
   1) constructing a open loop control chart comprising an ordinate time series of a manufacturing variable of interest, and an abscissa control limit window consisting of an upper and lower control limit;
   2) closing the open loop control chart by:
      i) utilizing the previous points on said control chart to forecast a predicted value of the time series;
      ii) plotting said predicted value;
      iii) predicting a further value of the time series on said control chart based on all previous points including said predicted value;
      iv) continuing to predict and plot said predicted values of the time series according to steps 3 and 4 until the desired region of prediction is complete
      v) alerting a user that said manufacturing process will be out-of-control in N time increments whenever a predicted value crosses over the upper or lower control limit.

* * * * *